United States Patent Office 3,677,893
Patented July 18, 1972

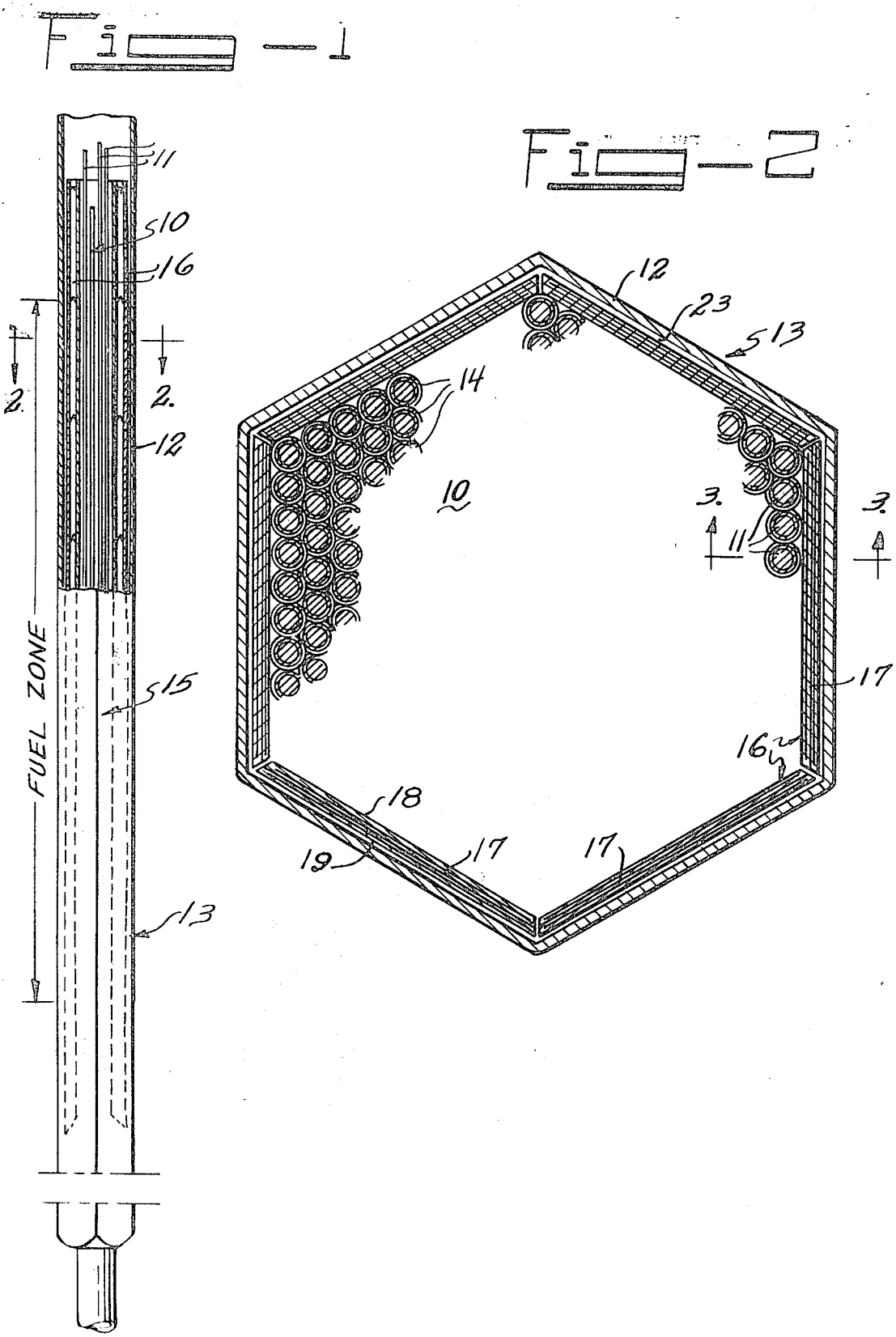

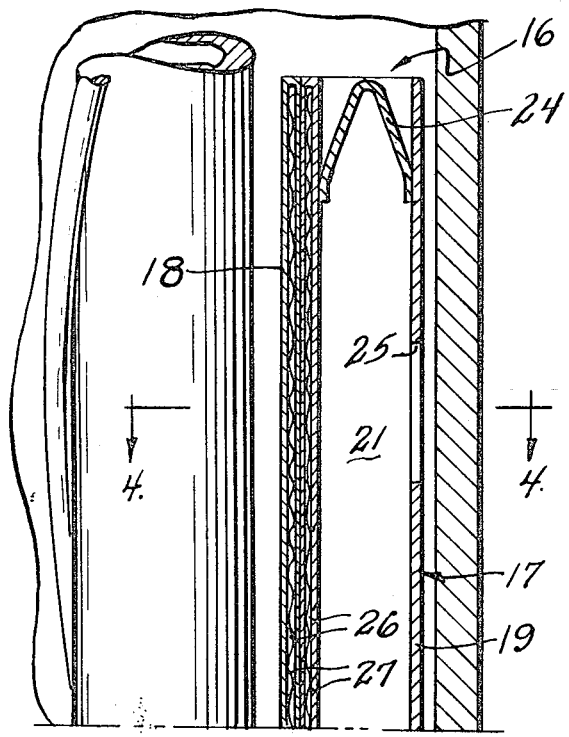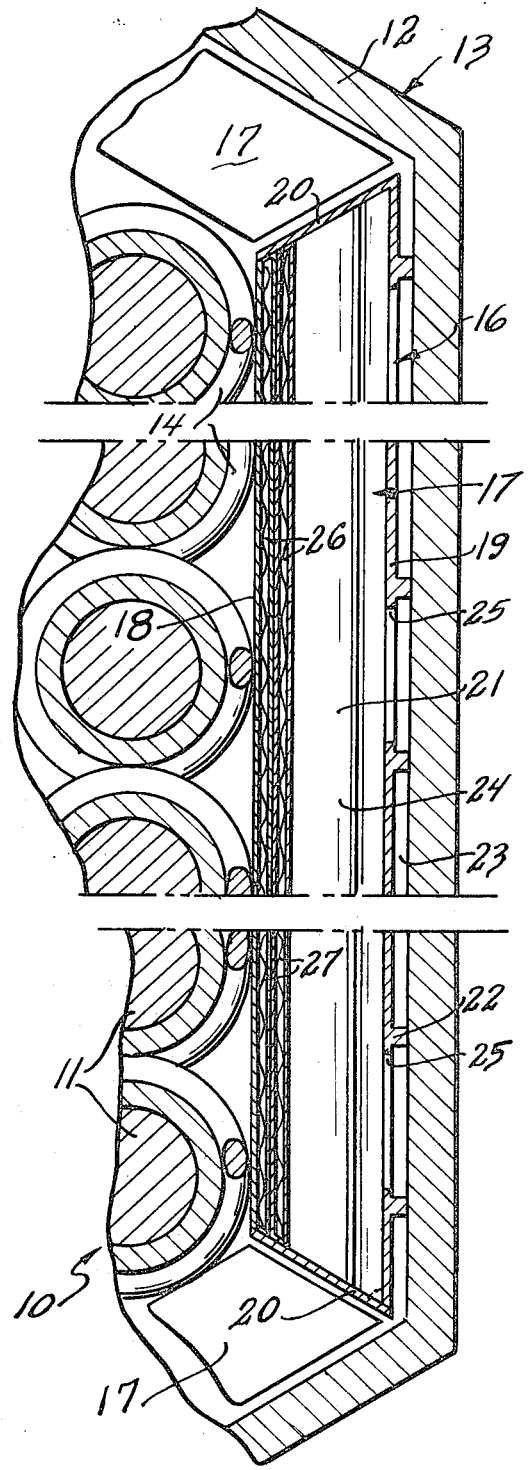

3,677,893
FUEL ASSEMBLY FOR A LIQUID-METAL-COOLED FAST BREEDER REACTOR
Paul R. Huebotter, Downers Grove, and Thomas R. Bump, Western Springs, Ill., assignors to the United States of America as represented by the United States Atomic Energy Commission
Filed Oct. 29, 1971, Ser. No. 193,952
Int. Cl. G21c 3/32
U.S. Cl. 176—78        5 Claims

ABSTRACT OF THE DISCLOSURE

A fuel assembly for a liquid-metal-cooled fast breeder reactor includes a bundle of stainless-steel-clad fuel pins enclosed within a stainless-steel coolant duct with a flow separator being disposed in the annulus between the bundle of fuel pins and the coolant duct. The flow separator is spaced away from the coolant duct to provide a coolant channel adjacent to the coolant duct and includes an inner and an outer wall enclosing a chamber filled with liquid-metal coolant. Imperforate springs extending across the chamber between the inner and outer wall yield when the fuel bundle swells and prevent vertical flow of coolant within the chamber. Flow vents are provided in the outer panel to equalize pressure between the interior of the flow separator and the coolant channel and evacuated insulating spaces containing a single layer of screen wire each are provided in the inner wall of the flow separator.

CONTRACTURAL ORIGIN OF THE INVENTION

The invention described herein was made in the course of, or under, a contract with the United States Atomic Energy Commission.

BACKGROUND OF THE INVENTION

This invention is closely related to the invention of patent application S.N. 114,768(70), filed Feb. 12, 1971 in the name of one of the present inventors.

This invention relates to the control of fast-neutron-induced swelling of structural materials used in a fast reactor.

In more detail, the invention relates to the prevention of swelling of the coolant ducts of a fast reactor.

The invention also relates to fuel assemblies for a fast breeder reactor in which swelling of the fuel pins in the fuel assembly will not cause swelling of the coolant ducts surrounding the fuel assemblies.

Fast breeder reactors now being designed typically include a plurality of fuel assemblies each consisting of a bundle of spaced, parallel, slender, elongated fuel pins containing a nuclear fuel material enclosed within a coolant duct through which liquid sodium flows. The fuel material in the fuel pins is protected from the sodium by cladding which must provide adequate containment for fuel and fission products while having a reasonably low cross section for neutrons. The austenitic stainless steels—such as type 316 stainless steel—are now favored for use as cladding material and as the material of construction of the coolant ducts.

A serious problem arising from the use of stainless steel for this purpose is the swelling which occurs in stainless steel at temperatures above about 650° F. when it has been irradiated with fast neutrons for a substantial length of time. Not only will this cause dilation of individual fuel pins which will result in dilation and bowing of the entire fuel bundle and thereby of the coolant duct surrounding the fuel bundle, but it will also cause swelling of the coolant duct directly. If the coolant ducts are expected to swell, large gaps must be left between assemblies when the assemblies are installed into the reactor. Thus the core cannot be made tight near the core midplane as is conventionally done with bearing pads affixed to the coolant ducts. Also elongation and bowing of fuel assemblies prdouce uncertainty and variance in the axial and radial location of their handling heads when the core is unclamped for fuel handling. Such uncertainties are troublesome in a blind fuel handling operation which is usually carried out in a sodium-cooled reactor.

SUMMARY OF THE INVENTION

According to the present invention, a generally annular flow separator is provided between the fuel bundle and coolant duct of a fuel assembly for a fast reactor to ensure that coolant at inlet temperature flows past the coolant duct. The flow separator consists of an inner and an outer wall defining a chamber filled with stagnant coolant with imperforate springs extending across the chamber which yield when the fuel bundle swells and which also prevent vertical flow of coolant within the flow separator. Flow vents are provided in the outer wall of the flow separator to relieve the pressure when the core bundle swells and evacuated insulating chambers containing screen wire are provided in the inner wall of the flow separator.

BRIEF DESCRIPTION OF THE DRAWINGS

The invention will next be described in connection with the accompanying drawing wherein:

FIG. 1 is a vertical elevation of a fuel assembly for a fast reactor with part of the assembly broken away to show the present invention, FIG. 2 is an enlarged horizontal sectional view taken on line 2—2 of FIG. 1, FIG. 3 is an enlarged partial vertical sectional view taken on line 3—3 of FIG. 2, and FIG. 4 is a horizontal sectional view taken on line 4—4 in FIG. 3.

DESCRIPTION OF A PREFERRED EMBODIMENT

As shown in the drawing, a hexagonal bundle 10 of spaced, parallel, round, slender, elongated, stainless-steel-clad fuel pins 11 is enclosed within a hexagonal stainless-steel coolant duct 12 to form a fuel assembly 13 for a fast breeder nuclear reactor. Fuel pins 11 are spaced from one another in a triangular pattern by helical wire wraps 14, as is conventional in the art. Fuel assembly 13 is five inches across flats and 144 inches long and contains nuclear fuel in fuel zone 15 which is 36 inches long.

According to the present invention, a hexagonal flow separator 16 consisting of six open-top cans 17 is disposed in the annulus between fuel bundles 10 and coolant duct 12. As shown in FIG. 4, each of cans 17 has an inner wall 18, an outer wall 19 and two side walls 20 to define a chamber 21 therein so disposed that cans 17 are in horizontal cross section a 60°—120° trapezoid. Adjacent cans 17 have abutting side walls 20 to minimize flow of coolant therebetween. It will be appreciated that a single, generally annular flow separator could be used rather than six separate cans, but for ease in construction a segmental form for the flow separator is specified. Outer walls 19 of cans 17 have longitudinal ribs 22 thereon which space flow separator 16 away from coolant duct 12, forming annular coolant channel 23 adjacent to coolant duct 12.

In operation, coolant, which may be and preferably is, sodium, enters the coolant duct at the bottom and flows upwardly therethrough, flow separator 16 serving to channelize the flow so that greater than 95% of the coolant flows through fuel bundle 10 and less than 5% flows through annular coolant channel 23, the exact percentage being a function of how effective an insulator flow separator 16 is. Sodium enters coolant duct 12 at 650° F. or less and is heated in the fuel bundle 10 by the fuel pins 12 whose maximum surface temperature is approximately 1200° F. Flow separator 16 channelizes less than 5% of the inlet coolant past coolant duct 12 to keep its temperature below 650° F. It is expected that not more than 3% of the inlet coolant will be required. As will be described hereinafter, flow separator 16 insulates annular channel 23 from the fuel bundle so that the coolant therein is not heated by the fuel. Due to the temperature dependence of fast-neutron-induced stainless steel swelling, little if any swelling of coolant duct 12 will occur.

To provide for fast-neutron-induced swelling of fuel bundle 10, a plurality of vertically spaced imperforate springs 24 extend horizontally at intervals of about six inches across cans 17. Springs 24 extend entirely across cans 17 to block longitudinal flow of coolant therein. Springs 24 take the form of a V-shaped plate oriented with the apex up, one end being attached to inner wall 18 of can 17, the other end being urged against wall 19 by the action of the spring. When fuel bundle 10 swells, springs 24 will yield, permitting the fuel bundle to grow 15% $\Delta V/V$ without causing swelling of coolant duct 12 or blockage of annular coolant channel 23.

The outer walls 19 of cans 17 have coolant flow vents 25 present therein just below each of springs 24. Cans 17 are thus filled with sodium which is relatively stagnant because springs 24 prevent vertical flow within the cans. It is desirable to prevent coolant flow within flow separator 16, since any flow therein is wasted, serving no useful purpose while degrading the coolant outlet temperature. Vents 25 permit free movement of sodium between cans 17 and annular channel 23 to equalize the pressure inside of cans 17 with the pressure outside of cans 17 when the bundle 10 swells and pushes inner walls 18 of cans 17 toward walls 19. Because coolant pressures in annular coolant channel 23 and in fuel bundle 10 are identical at any elevation, there is never a pressure gradient across the walls of cans 17.

Insulation of annular channel 23 from fuel bundle 10 is accomplished with two side-by-side evacuated spaces 26 in inner walls 18 of cans 17, each containing a single layer of screen wire 27 which prevents the wall from being crushed when the fuel bundle 10 swells. Duplicate spaces are included to provide redundancy protecting against complete loss of insulating effectiveness in case a leak occurs and one of the insulating spaces fills with sodium.

Flow separator 16 is 48 inches high, extending six inches above and below the top and bottom of fuel zone 15. The total thickness of flow separator 16 is 0.2 inch with the chamber 21 being 0.14 inch across and evacuated spaces each being 0.01 inch across. Coolant flow vents 25 are holes 0.2 inch in diameter. Finally, annular coolant channel 23 is 0.02 inch across.

This concept has a number of advantages over core designs that permit coolant duct swelling (1) the need for a massive core clamp to suppress coolant duct bowing is eliminated (2) the traditional practice of affixing bearing pads to the coolant duct near the core midplane can be retained (3) the fuel handling problem is eased by assurance of straight channels and dependable locations of handling heads (4) all departures from current design practice are within the fuel assembly, and necessary development testing can be done in commonly available facilities (5) maximum flexibility is retained for capitalizing on advances in materials' technology during the life of the plant; and (6) the hazard of assembly-to-assembly damage propagation is reduced by the additional barriers between fuel bundles and the energy-absorbing material within the coolant duct, while disadvantages of the concept are the relatively low reactor inlet temperature, the hardware cost, and a lower fuel volume fraction.

The embodiments of the invention in which an exclusive property or privilege is claimed are defined as follows:

1. A fuel assembly for a liquid-metal-cooled fast breeder nuclear reactor comprising a bundle of spaced, parallel, elongated, stainless-steel-clad fuel pins enclosed within a stainless-steel coolant duct, a flow separator disposed in the annulus between the fuel bundle and the coolant duct and spaced from the coolant duct to provide an annular coolant channel adjacent to the coolant duct, said flow separator consisting of inner and outer walls defining a chamber filled with liquid-metal coolant and containing a plurality of vertically spaced imperforate springs extending completely across the chamber, said springs accommodating swelling of the fuel bundle and preventing vertical flow of coolant within the flow separator, coolant flow vents in the outer wall of the flow separator below each spring, said coolant flow vents serving to relieve the hydraulic pressure in the flow separator when the fuel bundle swells and means within the inner wall of the flow separator for insulating the flow separator from the fuel bundle.

2. A fuel assembly according to claim 1 wherein the inner wall of the flow separator contains two side-by-side evacuated spaces each containing a single thickness of screen wire, said evacuated spaces serving as said insulating means.

3. A fuel assembly according to claim 2 wherein the fuel bundle and coolant duct are hexagonal in cross section and the flow separator consists of six open-top cans, each being in horizontal cross section of 60°–120° trapezoid.

4. A fuel assembly according to claim 3 wherein each of said springs consists of a V-shaped plate oriented with the vertex up, one edge thereof being attached to the inner wall of the flow separator and the other end being urged against the outer wall by the action of the spring.

5. A fuel assembly according to claim 4 wherein vertical ribs on the outer wall of the flow separator space the flow separator from the coolant duct.

References Cited

UNITED STATES PATENTS

| 3,356,587 | 12/1967 | Heck | 176—78 |
| 3,104,218 | 9/1963 | Speidel et al. | 176—78 |
| 3,421,977 | 1/1969 | Hutchinson et al. | 176—40 |
| 3,398,053 | 8/1968 | Huber et al. | 176—78 |
| 3,528,495 | 9/1970 | Armstrong et al. | 176—87 X |
| 3,629,061 | 12/1971 | Noyes | 176—92 |
| 3,317,399 | 5/1967 | Winders | 176—76 X |

BENJAMIN R. PADGETT, Primary Examiner

G. G. SOLYST, Assistant Examiner

U.S. Cl. X.R.

176—40